(12) United States Patent
Sibtain et al.

(10) Patent No.: US 6,180,730 B1
(45) Date of Patent: Jan. 30, 2001

(54) CATALYST DEACTIVATION

(75) Inventors: Fazle Sibtain; Antonio Pietro Nicola; Stephen John Brown, all of Calgary; Linda Jean Santry, Georgetown, all of (CA)

(73) Assignee: NOVA Chemicals (International) S.A., Villars-sur-Glâne (CH)

( * ) Notice: Under 35 U.S.C. 154(b), the term of this patent shall be extended for 0 days.

(21) Appl. No.: 09/210,469

(22) Filed: Dec. 12, 1998

(30) Foreign Application Priority Data

Jan. 21, 1998 (CA) .................................................. 2227674

(51) Int. Cl.$^7$ ....................................................... C08F 2/38
(52) U.S. Cl. .............................. 526/84; 526/82; 526/128; 526/352; 528/485; 528/489
(58) Field of Search ............................... 526/82, 84, 128, 526/352; 528/485, 489

(56) References Cited

U.S. PATENT DOCUMENTS

| | | | |
|---|---|---|---|
| 4,105,609 | * 8/1978 | Machon et al. ..................... | 260/23 H |
| 4,284,762 | 8/1981 | Miyata et al. ........................ | 528/485 |
| 4,347,353 | 8/1982 | Miyata et al. ........................ | 528/485 |
| 4,379,882 | 4/1983 | Miyata ................................. | 524/436 |
| 4,547,620 | * 10/1985 | Miyata et al. ....................... | 585/852 |
| 4,634,744 | 1/1987 | Hwang et al. ......................... | 526/84 |
| 4,731,438 | * 3/1988 | Bernier ................................ | 528/483 |
| 4,801,683 | * 1/1989 | May ..................................... | 528/485 |
| 4,803,259 | 2/1989 | Zbovick et al. ...................... | 528/483 |
| 5,155,145 | * 10/1992 | Foster et al. ........................ | 523/212 |

FOREIGN PATENT DOCUMENTS

| | | |
|---|---|---|
| 2049894 | * 5/1971 | (DE) . |
| 405170806 | * 7/1993 | (JP) . |

* cited by examiner

Primary Examiner—David W. Wu
Assistant Examiner—Luig Sui Choi
(74) Attorney, Agent, or Firm—Kenneth H. Johnson

(57) ABSTRACT

A particulate deactivator is used to pacify halogen-containing catalyst residues from a medium pressure solution polymerization process. The deactivator is added post-reactor preferably in the form of a suspension. The particulate deactivator may also be used in conjunction with a secondary, soluble deactivator.

15 Claims, No Drawings

CATALYST DEACTIVATION

FIELD OF THE INVENTION

This invention relates to a method for deactivating and pacifying halogen-containing catalyst residues in a medium pressure solution process to polymerize ethylene. The deactivator is an insoluble particulate material which is added to the process as a suspension.

BACKGROUND OF THE INVENTION

Thermoplastic polyethylene is commercially produced by three important classes of catalysts, namely free radical catalysts (such as the peroxides and/or hydroperoxides which are typically used in the so-called "high pressure" polymerization process); chromium catalysts (such as the supported chromium oxides which are used in the so-called "Phillips" polymerization process); and "Ziegler-Natta" type catalysts which are typically used in "gas phase" processes and "medium pressure solution processes".

The polymer solution emerging from the reactor system in the medium pressure polymerization process still contains unreacted monomers and active catalyst which would continue an uncontrolled polymerization reaction in the process equipment down-stream from the polymerization reactor system and thus compromise the quality of the desired commercial polymer. Therefore the catalyst has to be deactivated.

There are many deactivators known including various amines (see, for example, U.S. Pat. No. 4,803,259 to Zboril et al; alkali or alkaline earth metal salts of carboxylic acid (especially calcium stearate, per U.S. Pat. No. 4,105,609 to Machon et al); water (U.S. Pat. No. 4,731,438 to Bernier et al); and hydrotalcites (or synthetic clays) as disclosed in U.S. Pat. No. 4,379,882. In fact most polar compounds will deactivate a Ziegler catalyst at the typical temperature at the reactor exit.

However, most Ziegler-Natta catalysts contain halogens (typically chlorine) which remain in the polyethylene and may cause undesirable reactions (especially corrosion of metals which come into subsequent contact with the polyethylene). In a solution polymerization process, these undesirable reactions may occur in process vessels which are immediately downstream of the polymerization reactor so there is a need to employ an effective "deactivator" either in, or downstream from, the polymerization reactor.

Preferred deactivators should also satisfy the following requirements: a deactivator must deactivate the catalyst rapidly; must not deposit on the equipment (particularly on heater surfaces); must not generate color or odor and must be safe and non-toxic. This limits the types of useful deactivators and dictates the way they are added to the reactor effluent. Accordingly, the selection of optimal deactivators and the method of their use depends upon the process in question.

The method of adding the deactivator is affected by the form of the polyethylene product and the type of polymerization reactor. In general, it is not particularly difficult to add a deactivator to the solid product from a gas phase or slurry polymerization process. (See, for example, the aforementioned U.S. Pat. No. 4,731,438 which discloses that water may be added to the solid product from a gas phase polymerization process by simply spraying the water into a purge bin.) Likewise, it is not particularly difficult to deactivate the molten solution product which emerges from a high pressure, plug flow tubular reactor—as the deactivator may be added directly to the end of the reactor tube. (See, for example, U.S. Pat. No. 4,634,744; Huang et al). However, the direct addition of a deactivator at the exit of a back-stirred reactor (such as a CSTR) would kill the reaction.

Conversely, the addition of a particulate deactivator to the polyethylene solution at a point downstream of the reactor is not trivial—particularly with respect to the problem of achieving fast deactivation by adequate dispersion of the deactivation throughout the solution.

Often, it is advantageous to separate the catalyst deactivation and passivation. Thus a soluble deactivator such as methanol may be added first, and a suspension of a passivator second. Methanol mixes well and deactivates quickly, but the so-deactivated catalyst must also be passivated.

SUMMARY OF THE INVENTION

The present invention provides an improved method to add a particulate deactivator to a polyethylene solution which is produced in a medium pressure solution polymerization process. More particularly the improvement comprises a process to prepare a polyethylene solution wherein ethylene is polymerized with a halogen-containing Ziegler-Natta catalyst system, at a pressure of from 3 to 35 mega Pascals ("MPa") and a temperature of from 100 to 320° C. in the presence of a solvent for said polyethylene, the improvement which comprises the injection of a particulate deactivator to said polyethylene solution subsequent to the discharge of same from said stirred reactor further characterized in that said deactivator is selected from a metal carbonate and hydrotalcite.

In a preferred embodiment, a soluble secondary deactivator is also used. In a particularly preferred embodiment, the deactivator suspension contains a polymeric "suspension enhancer" which is preferably a mixture of isobutylene polymer and a long chain carboxylic acid.

DETAILED DESCRIPTION

This invention specifically relates to a unit operation of a medium pressure solution process for ethylene polymerization. The term "medium pressure solution" will, in general, be well understood by those skilled in the art of ethylene polymerization and is widely described in the literature.

A brief description of the medium pressure solution polymerization process follows.

The polymerization takes place in a solvent for the resulting polyethylene, at a temperature which is sufficient to maintain polymer solubility. Suitable solvents include $C_{5-20}$ alkanes, cycloalkanes, aromatics and mixtures thereof. Non-limiting examples include hexane, methyl pentane, cyclohexane, and commercially available solvents (such as the mixed alkane solvents sold under the trademarks "Exxsol®" and "Isopar®" by Exxon). The lower temperature limit is fixed by polymer solubility (100° C. is generally a practical minimum) and by pressure consideration at the upper limit (about 320° C. is a practical maximum).

The term "medium pressure" refers to a pressure which is sufficiently high to allow economic monomer correlations but low enough to avoid the use of expensive high pressure reactions. In practical terms, this fixes pressures at about 35 MPa.

Ethylene may be either homopolymerized or copolymerized with at least one copolymerizable olefin. Suitable alpha olefin comonomers include propene, butene, pentene, hexene, heptene, norbornene and octene with butene and octene being particularly preferred. In copolymerization, the resulting copolymer contains comonomer units so as to produce thermoplastic polyethylene of reduced crystallinity.

The resulting thermoplastic copolymers may be high density polyethylene (having a density of at least 0.935 grams/cubic centimeter ("g/cc") which is produced using small amounts of alpha olefin comonomer); low density polyethylene (having a density of from 0.910 to 0.934 g/cc, which is produced using larger amounts of alpha olefin comonomer) or very low/ultra low density polyethylene (having a density of from about 0.88 g/cc to 0.909 g/cc, produced with still larger amounts of comonomer).

The polymerization is catalyzed by a halogen-containing catalyst system which includes a transition metal catalyst and a cocatalyst. The transition metal catalyst is typically provided in the form of a metal halide (especially a metal chloride) and the cocatalyst is typically an aluminum alkyl which may also contain a halide ligand. Preferred catalyst systems comprise a titanium or vanadium halide.

A magnesium alkyl or magnesium alkyl halide may also be part of the catalyst component.

The term "Ziegler-Natta" is widely used in the literature to describe such transition metal catalyst/aluminum alkyl cocatalyst systems.

The polymerization is preferably conducted in a continuous flow stirred reactor. This means that solvent/catalyst/monomers are pumped into the reactor on a continuous basis; the polymerization reactor is stirred (to provide mixing of the reactor contents) and a polyethylene solution is withdrawn from the reactor on a continuous basis.

The polyethylene solution contains solvent, dissolved polyethylene, catalyst residues and unreacted monomer. The polyethylene is recovered in post-reactor unit operations which include monomer recovery, solvent flashing, drying and pelletizing. These post-reactor unit operations are exposed to the halogen-containing catalyst residues. If left untreated, these catalyst residues may cause undesired reactions (including post-reactor oligomerization/polymerization of monomer, corrosion of post-reactor equipment in the polymerization plant and, more particularly, corrosion of equipment in plants where the polyethylene is converted into end-use articles such as plastic film and molded plastic goods). In addition, certain polymer properties (such as color, molecular weight distribution and "melt flow" properties) may also be affected over time if the catalyst residues are not properly deactivated.

Thus, the present invention is directed towards the "post-reactor deactivation" (with respect to oligomerization) and passivation of the halogen-containing catalyst residues in polyethylene produced using a continuous flow medium pressure solution polymerization process.

The primary deactivator of this invention is a particulate material. The term particulate means that the deactivator has a small particle size (preferably such that greater than 95% of the particles have a size of less than one micron) and is not soluble in the polymerization solvent. Examples of particulate materials which are suitable for use in this invention include metal carbonates (such as calcium carbonate and magnesium carbonate) and coated or uncoated synthetic clay (also known as hydrotalcite or "HT"). The use of a coated HT is preferred. The term "hydrotalcite" is well known in the art and is used herein to convey its conventional meaning. Hydrotalcites are most typically hydrated magnesium carbonates, though certain hydrotalcites are "carbonate-free".

Exemplary hydrotalcites are described by the following formulae:

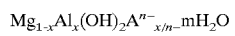
$$Mg_{1-x}Al_x(OH)_2A^{n-}{}_{x/n}\cdot mH_2O$$

(wherein 0<x=<0.5, m is a positive number represented by 0≦m<2, and $A^{n-}$ represents an anion having a valence of n)

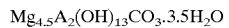
$$Mg_{4.5}A_2(OH)_{13}CO_3\cdot 3.5H_2O$$

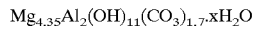
$$Mg_{4.35}Al_2(OH)_{11}(CO_3)_{1.7}\cdot xH_2O$$

$$Zn\ Mg_3Al_2(OH)_{12}CO_3\cdot 3H_2O$$

Detailed descriptions of HT are in U.S. Pat. Nos. 4,284,762; 4,347,353, 4,634,744, and 4,379,882. Preferred forms of HT are those which are commercially available (such as those sold under the tradenames DHT-4A, DHT-4A-2 and ZHT-4A by Kyowa Chemical Industry Co., Japan and as L-55RII by Reheis Inc. of NJ, USA).

The addition of the particulate deactivator to the polyethylene solution in a manner which provides good dispersion is not trivial. The addition according to the present invention is made post-reactor (i.e. "downstream" from the reactor— in an environment where mixing/mechanical/agitation may not be available to facilitate the incorporation of the deactivator into the polyethylene solution). In view of this difficulty, it is particularly preferred to: (a) use the particulate deactivator in combination with a soluble, secondary deactivator; and (b) add the particulate deactivator in the form of a stabilized suspension.

The soluble secondary deactivator is generally a polar liquid which is miscible/soluble in the polyethylene solution. Preferred secondary deactivators are oxygen containing molecules (such as alcohols, water, ketones, ethers, polyethers, carboxylic acids) with carboxylic acids having from 8 to 20 carbon atoms and alcohols (especially methanol) being most preferred. While not wishing to be bound by any theory, it is believed that the secondary deactivator very quickly provides a partial deactivation of the catalyst which is sufficient to mitigate oligomerization/polymerization problems in the polymerization plant and the primary (particulate) deactivator provides longer term catalyst passivation. The primary deactivator, HT, can be used on its own (preferably in an amount of less than 1500 ppm on a polymer basis). MeOH can also be used on its own (preferably in a concentration of about 5 to 35 ppm in the polyethylene solution) but there are possible negative impacts on process equipment. The soluble secondary deactivator may be added to the polyethylene solution prior to the addition of the particulate deactivator.

The particulate deactivator is preferably added to the post reactor polyethylene solution in the form of a stabilized suspension. The stabilized suspension contains the deactivator, a liquid hydrocarbon (which is preferably a solvent for the polyethylene), and a "suspension stabilizer". The "suspension stabilizer" is an additive which reduces the rate at which the insoluble deactivator precipitates from the solvent. The suspension stabilizer may be a surfactant and/or a thickening agent. Exemplary suspension stabilizers include polyoctene (such as that sold under the tradename Flo 1010, by Baker Performance Chemicals Inc.), polyethylene glycol and polyisobutylene. The use of polyisobutylene ("PIB") as a thickening agent is particularly preferred. Highly preferred PIB has a viscosity average molecular weight (Mn) of from about 600 to about 400,000. Such polyisobutylenes are available from Amoco under the trademark "Indopol™". It is particularly preferred to use a suspension which consists of from 2 to 15 weight percent HT (based on the weight of solvent) from 2 to 5 weight percent PIB (based on the weight of solvent), and from 2 to 5 weight percent nonanoic acid.

This suspension may be added together with the afore-described secondary deactivator or, alternatively, the suspension may be added independently of the secondary deactivator. It is particularly preferred to add the secondary deactivator immediately post-reactor and then add the suspension at a point in the process which is further downstream.

Further details are illustrated by the following non-limiting examples.

EXAMPLES

Example 1

Lab Screening Experiments

A series of lab-scale screening experiments were undertaken to identify materials which deactivated conventional Ziegler-Natta polymerization catalysts. A deactivator was considered for further testing if it was successful in terminating/preventing olefin polymerization and generated minimal by-products or color. Deactivators which satisfied these criteria include water, various carboxylic acids, carbon monoxide, zinc oxide, zinc stearate, calcium stearate, dimethyl carbonate, diethyl carbonate, erucamide, glycerol monostearate and various commercially available hydrotalcites ("HT"), including those sold by Kyowa and Reheis under the tradenames DHT-4A, DHT-4, DHT-4A-2, ZHT-4A and L-55RII.

The HT materials provided particularly good results. Moreover, the use of HT materials in a commercial polyethylene product was considered feasible because similar HT materials have enjoyed commercial success when compounded into solid polypropylene resins. However, the HT materials have the undesirable characteristic of being comparatively dense particles which quickly settle out of the solvent commonly used in the solution polymerization of ethylene.

Example 2

Pilot Plant Trials

The use of HT, methanol ("MeOH") and nonanoic acid ("NAc") as potential deactivators was tested at a solution polymerization polyethylene pilot plant. The solution polymerization was conducted in a stirred autoclave reactor using a titanium chloride/magnesium chloride/aluminum alkyl catalyst. A large series of polymerizations were completed, resulting in a variety of polyethylene solutions exiting the stirred autoclave reactor having polyethylene concentrations of 2 to 15 weight per cent; residual chloride concentrations of up to 200 ppm and residual titanium concentrations of up to 15 ppm.

A long insulated pipe was installed between the polymerization reactor and the pressure letdown vessel. In the absence of any added deactivator, some continued polymerization is observed in this pipe (as evidenced by an increase in solution temperature and an increase in ethylene conversion). See Table 1.

TABLE 1

| Deactivator Addition At Reactor Exit | Deactivator Addition At Pressure Letdown Vessel | Temperature Difference Between Reactor & Pressure Letdown Vessel | Difference In Conversion Between Reactor & Pressure Letdown Vessel |
|---|---|---|---|
| HT | — | No | No |
| HT + MeOH or NAc | — | No | No |
| MeOH and/or NAc | — | No | No |
| MeOH and/or NAc | HT | No | No |
| — | HT | Yes | Yes |
| — | — | Yes | Yes |

Addition of HT, MeOH or NAc (alone or in combination) in 3/1 to 7/1 molar excess (titanium basis) was sufficient to eliminate this post reactor polymerization problem. However, the use of HT alone resulted in some fouling of the process equipment (presumably from the tendency of the HT to settle out of solution).

The effect of the deactivators on UV/thermal stability (with respect to changes in color and tensile properties) and resin corrosivity were evaluated. The most "balanced" resin properties and process considerations were obtained with HT as single deactivator as well as HT/MeOH and HT/NAc. HT is a primary deactivator in that it functions well on its own. However, it is difficult to add HT (from an operability perspective it is undesirable to add the solid particles) and, hence, it is preferred to use HT in combination with a soluble secondary deactivator. HT improves the resin color, thermal and UV stability and suppresses resin corrosivity. Both MeOH and NAc can be used in combination and alone as a deactivator but there are concerns around process corrosion and resin corrosivity if used without HT. See Table 2.

TABLE 2

| Deactivator 1 | Deactivator 2 | Resin Color | Resin Tensile Stability | Resin Corrosivity | Process Corrosion Concerns |
|---|---|---|---|---|---|
| HT | — | Good | Very good | Very low | None |
| HT | MeOH | Good | Very good | Very low | Very low |
| HT | NAc | Good | Very good | Very low | Moderate |
| MeOH | — | Good - moderate | — | Very high | Low |
| MeOH | NAc | Good - moderate | Good | Very low | High |
| NAc | — | Good - moderate | Good | Very low | High |
| — | — | Poor | Poor | Very high | Moderate |

What is claimed is:

1. In a process to prepare a polyethylene solution wherein ethylene is polymerized with a halogen-containing Ziegler-Natta catalyst system, at a pressure of from 3 to 35 MPa and a temperature of from 100 to 320° C. in the presence of a solvent for said polyethylene, the improvement which comprises the injection of a particulate deactivator to said polyethylene solution subsequent to the discharge of same from said stirred reactor further characterized in that said deactivator is selected from a metal carbonate and a hydrotalcite.

2. The process according to claim 1 wherein ethylene is polymerized together with at least one other alpha olefin having from 3 to 10 carbon atoms.

3. The process according to claim 1 wherein said halogen-containing catalyst system contains titanium, magnesium and aluminum as essential elements.

4. The process according to claim 1 wherein said deactivator is a hydrotalcite.

5. The process according to claim 4 wherein said hydrotalcite is a defined by one of the following formulae:

$$Mg_{1-x}Al_x(OH)_2A^{n-}{}_{x/n}\cdot mH_2O$$

(wherein $0 < x = < 0.5$, m is a positive number represented by $0 \leq m < 2$, and $A^{n-}$ represents an anion having a valence of n)

$$Mg_{4.5}Al_2(OH)_{13}CO_3 \cdot 3.5H_2O$$

$$Mg_{4.35}Al_2(OH)_{11}(CO_3)_{1.7} \cdot xH_2O$$

$$Zn\ Mg_3Al_2(OH)_{12}CO_3 \cdot 3H_2O.$$

6. The process according to claim 5 wherein said hydrotalcite is selected from:

$$Mg_{4.5}Al_2(OH)_{13}CO_3 \cdot 3.5H_2O\ and\ Mg_{4.35}Al_2(OH)_{11}(CO_3)_{1.7} \cdot xH_2O.$$

7. The process according to claim 3 wherein the molar ratio of said HT to said titanium is from 3/1 to 7/1.

8. The process according to claim 1 wherein said deactivator is employed in combination with a soluble secondary deactivator.

9. The process according to claim 8 wherein said soluble secondary deactivator is added post-polymerization to the reactor but prior to the addition of said particulate deactivator.

10. The process according to claim 9 wherein said soluble secondary deactivator is selected from the group consisting of alcohols, water, ketones, ethers, polyethers and carboxylic acids.

11. The process according to claim 10 wherein soluble secondary deactivator is selected from methanol and carboxylic acids having from 8 to 20 carbon atoms.

12. The process according to claim 1 wherein a suspension enhancer for said particulate deactivator is further employed.

13. The process according to claim 12 wherein said suspension enhancer is polyisobutylene and said particulate deactivator is a hydrotalcite.

14. The process according to claim 13 wherein said hydrotalcite is added to a suspension comprising from 2 to 15 weight per cent hydrotalcite, from 2 to 15 weight per cent isobutylene and the balance solvent.

15. The process according to claim 4 wherein said suspension further contains from 2 to 5 weight percent nonanoic acid.

* * * * *